United States Patent Office 2,884,265
Patented Apr. 28, 1959

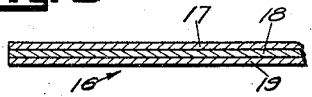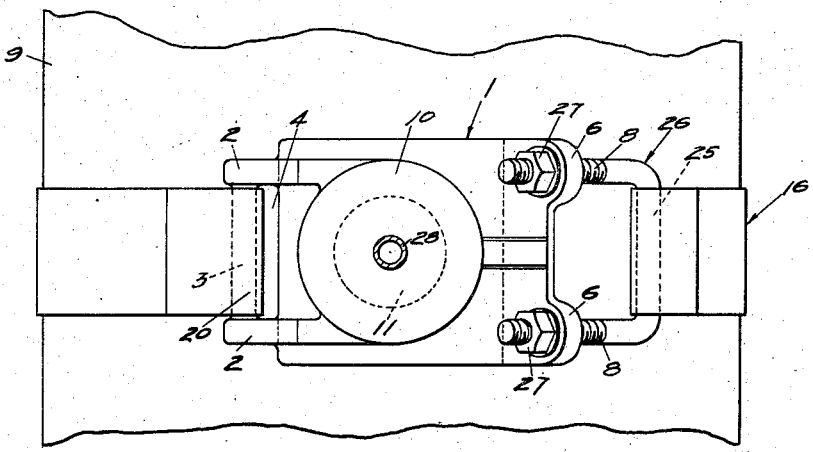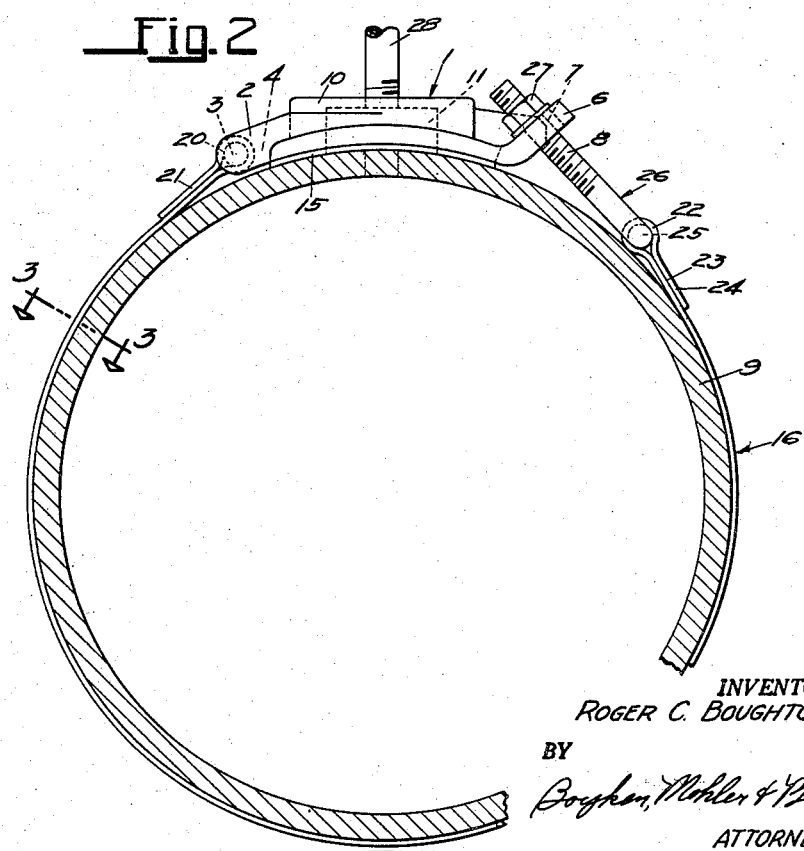

2,884,265

PIPE SADDLE AND LAMINATED STRAP MEANS FOR SECURING SAME TO PIPE

Roger C. Boughton, Alhambra, Calif.

Application May 22, 1953, Serial No. 356,769

2 Claims. (Cl. 285—197)

This invention relates to a service saddle and repair clamp for pipe, and has for one of its objects the provision of a saddle and of means for securing the saddle onto a pipe, that enables a much smaller and more economically made saddle to be applied to a pipe than heretofore, and which saddle, by reason of its smaller size, is also much lighter in weight than heretofore and easier to handle.

Another object of the invention is the provision of a saddle and of means for securing it to a pipe, that is more easily secured to a pipe than heretofore, and which saddle is so constructed as to enable testing of the saddle for leaks and the detection of such leaks, much easier and more reliable than heretofore.

A still further object of the invention is the provision of a saddle and of means for securing it to a pipe, that are adapted to be used on pipe that would be injured by use of the conventional structure, and which pipe is not injured by the structure of this invention.

An additional object is the provision of a saddle that may be relatively uniform in size for any diameter pipe and which saddle is provided with a flexible metal strap for securing it to the pipe, which strap is adapted to conform to the curvature of the outside of the pipe.

Heretofore in tapping a main fluid supply pipe of say from approximately 4 to 36 inches in diameter in the case of metal pipe or up to about 66 inches in cement pipe, in order to provide service pipes for users located along the main supply pipe, it has been customary to secure a saddle onto the pipe, and the usual method has been to use U-bolts for this purpose. The supply pipe extends between the legs of the U-bolts and the free ends of said legs extend through apertures in the ends of the saddle. The saddle has an opening that is aligned with an opening in the pipe and the service pipe may be threaded or welded in the opening in the saddle. To repair a leak in a pipe, the only or main difference is that the saddle is positioned over the leak and a gasket between the saddle and surface around said leak seals the leak. The saddle is not apertured for a service pipe when it is used for repairing a leak.

Inasmuch as the legs of the U-bolts used to secure the conventional saddles onto pipe are parallel and must be spaced apart a distance equal, at least, to the diameter of the pipe, it will be seen that the saddle must be greater in length than the diameter of the pipe to enable the legs of the U-bolts to extend through the ends of the saddle.

In the case of a saddle for say a pipe of 20 inches in diameter, the effective sealing portion of the saddle including the structure for connecting a service line thereto, may require a body of say about 15 lbs., but by conventional structure, such saddle will weigh around 60 lbs. due to the excess material required for extending the saddle to connect with the legs of the U-bolts.

By the present invention, such excess costly and unnecessary material is eliminated inasmuch as a flexible strap is substituted for the U-bolts thereby making it unnecessary to extend the saddle any substantial degree beyond the effective sealing portion.

In some instances, where pipe is of composition material the use of a saddle of conventional structure is objectionable for the reason that the U-bolts injure the pipe, but by the present invention in which a metal strap is employed, the pipe is not injured and therefore a saddle can be used, without fear.

Also by the present invention the employment of a flexible strap is made practical and permanent bending of the strap when opened up is avoided by making a laminated strap in which the laminate are bands or strips of metal, and where lamina are used, the outer strip or strips may be of noncorrosive metal thus protecting the inner lamina or laminae against corrosion. Of course all of the laminae may be of noncorrosive metal, but in most instances it is more economical to make only the outermost lamina of such metal.

Other objects and advantages will appear in the description and in the drawings.

In the drawings:

Fig. 1 is a top plan view of the invention showing a service pipe in section, and secured to the saddle, and a section of the main pipe being indicated.

Fig. 2 is a fragmentary side elevational view of the invention on a pipe, the latter being indicated in cross section.

Fig. 3 is an enlarged fragmentary sectional view along line 3—3 of Fig. 2.

In detail, the saddle generally indicated at 1, may be a casting of iron, bronze or any desirable material, and which saddle has its inner surface, or the surface that is adjacent to the pipe, curved to follow the cylindrical contour of the outer side of the pipe. Opposed ears 2 project from one side or end of the casting or saddle, and a cross bar 3 is formed integral with said ears, the latter, in turn being formed integrally with the saddle.

A space 4 between the cross bar 3 and the main body enables a person to view the main body of the saddle along the line of seal between the curved inner surface of the saddle and the pipe.

The opposite end of the saddle also has a pair of ears 6 formed integrally with the saddle and which ears project in direction away from the inner side of said saddle and each ear is formed with an aperture 7 for the leg 8 of a U-bolt.

Apertures 7 have their axes directed generally circumferentially of pipe 9 against a side of which the saddle 1 is supported. Inasmuch as the ears 6 extend angularly outwardly away from said pipe, the line of seal below said ears and between the saddle and the pipe is easily seen by a person.

The main body of the saddle that is between ears 2 at one end thereof and ears 6 at the other end may be formed with a raised central portion 10, and the inner side of the saddle below said raised portion is formed with a recess 11 which is preferably circular. All around said recess is the curved surface of the casting or saddle that follows the cylindrical contour of the outer side of pipe 9. Between said curved surface and the pipe, a gasket 15 of rubber or any suitable composition material is positioned.

The means for securing the saddle to said pipe comprises a flexible laminated metal strap generally designated 16. The laminae are not indicated in Fig. 2 for purpose of clarity, but in Fig. 3, it is seen that the strap is made up of bands or strips 17, 18, 19 of metal. Only two laminae may be used, or more than three, if desirable. However, the employment of lamina instead of solid metal, enables the strap to be readily opened up for positioning and removing the saddle on a pipe, a result not possible with a solid band of equal strength.

The strap 16 is formed at one end with a loop 20 that encloses the bar 3, and the laminae are welded together along the adjacent edges of the folded over portion at 21 (Fig. 2) which welding also secures the folded over portion of the strap to the body or remainder of the strap.

Loop 22 at the other end of the strap is formed in the same manner as loop 20, and welding along line 23 along the edges of the laminae where portion 24 is folded over the remainder, secures the loop 22 around the closed end 25 (Fig. 1) of the U-bolt 26 that has legs 8.

The legs 8 of said U-bolt extend through the aperture 7 in ears 6 of the saddle as has already been described, and nuts 27 on the threaded ends of the U-bolt that project from the outer sides of ears 6 serve to tighten the saddle on the pipe.

In the case of a repair for stopping a leak, the center of the saddle is over such leak, and the bottom of recess 11 will be imperforate, but where the saddle functions for connecting a service line to the main line, the bottom of recess 11 will be formed with an opening for receiving the end 28 of a service pipe. The sides of said opening may be threaded so as to threadedly engage the threads on the pipe, or the opening in the saddle may be burned therein with a torch and the end of the pipe welded in place in said opening. Obviously the pipe 16 will also be formed with an opening substantially in alignment with the opening that receives the service pipe.

After the saddle is securely clamped to the pipe, it is customary to smear a soapy solution around the line of seal between the saddle and pipe (or around the edges of gasket 15, and where the fluid in pipe 9 is a gaseous fluid, the formation of bubbles in said solution will quickly indicate if there is a leak. In the case of a liquid fluid, it is manifest that the liquid will make itself evident should there be a leak.

The present structure, as has been explained and as will be seen in the drawings, makes it easy for an operator to detect a leak. This would be difficult, if not impossible, were any portion of the saddle along the line of its seal with the pipe, to be obscured.

Earlier in the description, it was pointed out that the outer lamina 17 could be made of noncorrosive metal, or metal that would resist corrosion, such as stainless steel and bronze, or any number of the laminae could be of noncorrosive metal.

In some instances, it has been found possible and desirable to weld the saddle onto the pipe after it has been tightly clamped in position, and to thereafter burn off the ears 2 and 6 and to remove the strap. The present structure makes this a possible operation where it would be virtually impossible with conventional strutcure in which the saddle is of a length greater than the diameter of the pipe on which it is positioned.

The diameter of recess 11 is such as to enable any practical sized opening to be formed in the bottom thereof, and as the bottom is spaced a substantial distance from pipe 9, a hole can be cut in said bottom without danger of prematurely cutting a hole in the pipe. The cutting of a hole in pipe 9 where the latter carries flammable gas, is accomplished by conventional methods, not a part of this invention.

By use of the loop 20 on bar 3, the saddle 1 will pivot at the loop so that the saddle can be swung away from the pipe when the U-bolt is disconnected from the saddle, or in installing the saddle, the latter can be swung away from the portion of the pipe it is to cover in order to clean the pipe or during adjusting and positioning of the saddle. This is an advantage over structure where the saddle must be disconnected from U-bolts that straddle the pipe in order to uncover the pipe or in installing the saddle.

I claim:

1. A pipe saddle comprising: a metal body having a concavely curved inner surface of cylindrical contour to substantially follow the outer surface of a cylindrical pipe, said body having a central, circular portion projecting from the side thereof opposite to said concave surface for securement of the end of a pipe therein, a flexible, laminated, metal strap formed with loops at its opposite ends with the lamina of said strap being respectively continuous from loop to loop including the portions forming said loops and said lamina being free from securement to each other between end portions of said strap including said loops, a pair of parallel bars respectively positioned at each of two opposite sides of said central circular portion and spaced outwardly of the two opposite ends of said body so that said body is disposed between said bars, spaced members securing the ends of said bars to said body and spacing said bars outwardly of said ends of said body, at least one pair of said members and the bar secured thereto being a U-bolt having nuts thereon for adjustably and releasably securing said bolt to said body, said loops rotatably enclosing said bars to enable said strap to accommodate itself to the contour of a pipe having said body therein free from bending strain at the points of connection between said bars and said straps and to enable said body to be swung about either of said bars, the length of said body circumferentially of said cylindrical surface being substantially less than the pipe adapted to be enclosed by said strap and saddle.

2. A pipe saddle comprising: a metal body having a concavely curved inner surface of cylindrical contour to substantially follow the outer surface of a cylindrical pipe, said body having a central, circular portion projecting from the side thereof opposite to said concave surface for securement of the end of a pipe therein, a flexible, laminated metal strap formed with loops at its opposite ends with the lamina of said strap being respectively continuous from loop to loop including the portions forming said loops and said lamina being free from securement to each other between end portions of said strap including said loops, a pair of parallel bars respectively positioned at each of two opposite sides of said central circular portion and spaced outwardly of the two opposite ends of said body so that said body is disposed between said bars, spaced members securing the ends of said bars to said body and spacing said bars outwardly of said ends of said body, at least one pair of said members and the bar secured thereto being a U-bolt having nuts thereon for adjustably and releasably securing said bolt to said body, said loops rotatably enclosing said bars to enable said strap to accommodate itself to the contour of a pipe having said body therein free from bending strain at the points of connection between said bars and said straps and to enable said body to be swung about either of said bars, the length of said body circumferentially of said cylindrical surface being substantially less than the pipe adapted to be enclosed by said strap and saddle, said central circular portion being formed with a circular recess opening through said concave surface with the bottom of said recess spaced outwardly of said curved surface and being relatively thin with respect to the remainder of said body to facilitate forming different sized openings therein for the said pipe to be secured in said projection.

References Cited in the file of this patent

UNITED STATES PATENTS

| | | |
|---|---|---|
| 679,139 | Brett | July 23, 1901 |
| 962,566 | Gerth | June 28, 1910 |
| 1,146,813 | Peterman et al. | July 20, 1915 |
| 1,185,927 | O'Brien | June 6, 1916 |
| 1,278,598 | Cooper | Sept. 10, 1918 |
| 1,459,030 | Mueller | June 19, 1923 |
| 1,684,666 | Frazier | Sept. 18, 1928 |
| 1,892,722 | Dodge | Jan. 3, 1933 |
| 2,283,179 | Buckingham | May 19, 1942 |

FOREIGN PATENTS

| | | |
|---|---|---|
| 423,700 | France | Feb. 22, 1911 |
| 646,620 | France | July 17, 1928 |